(12) United States Patent
Golobay et al.

(10) Patent No.: US 8,713,142 B2
(45) Date of Patent: Apr. 29, 2014

(54) PROFILE-BASED USER ACCESS TO A NETWORK MANAGEMENT SYSTEM

(75) Inventors: Paul M. Golobay, Farmers Branch, TX (US); John M. Hahs, Celina, TX (US); Hieu V. Mai, Forth Worth, TX (US); Kelvin R. Russell, Boonville, MO (US); Parker C. Webb, Rowlett, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1432 days.

(21) Appl. No.: 11/298,604

(22) Filed: Dec. 12, 2005

(65) Prior Publication Data
US 2007/0136371 A1  Jun. 14, 2007

(51) Int. Cl.
*G06F 15/173* (2006.01)
(52) U.S. Cl.
USPC .......................................... 709/223; 709/224

(58) Field of Classification Search
USPC .................................................. 709/223, 224
See application file for complete search history.

(56) References Cited

U.S. PATENT DOCUMENTS

| | | | |
|---|---|---|---|
| 2002/0165960 A1* | 11/2002 | Chan | 709/225 |
| 2005/0149514 A1* | 7/2005 | Tsuzuki et al. | 707/3 |
| 2005/0198247 A1* | 9/2005 | Perry et al. | 709/223 |
| 2006/0085536 A1* | 4/2006 | Meyer et al. | 709/224 |
| 2007/0055785 A1* | 3/2007 | Stevens | 709/229 |

* cited by examiner

*Primary Examiner* — Adnan Mirza

(57) ABSTRACT

A system includes a relational database and processing logic. The relational database is configured to define a relationship between users and a group of device groups to which the users are permitted access. The processing logic is configured to receive identification information from a user, identify one or more device groups using the relational database and the user identification information, construct a first graphical user interface using the one or more device groups, and provide the first graphical user interface to the user.

14 Claims, 14 Drawing Sheets

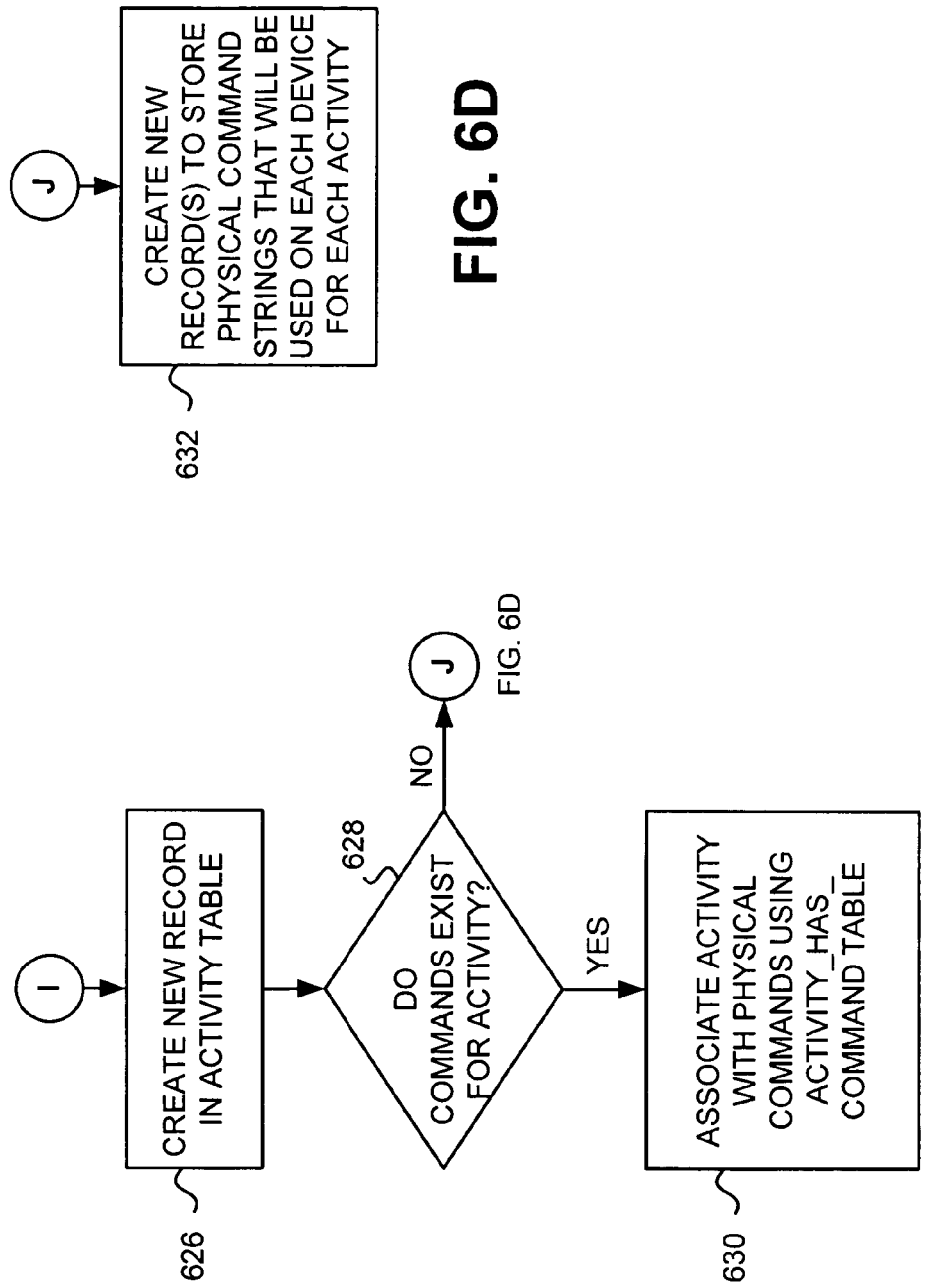

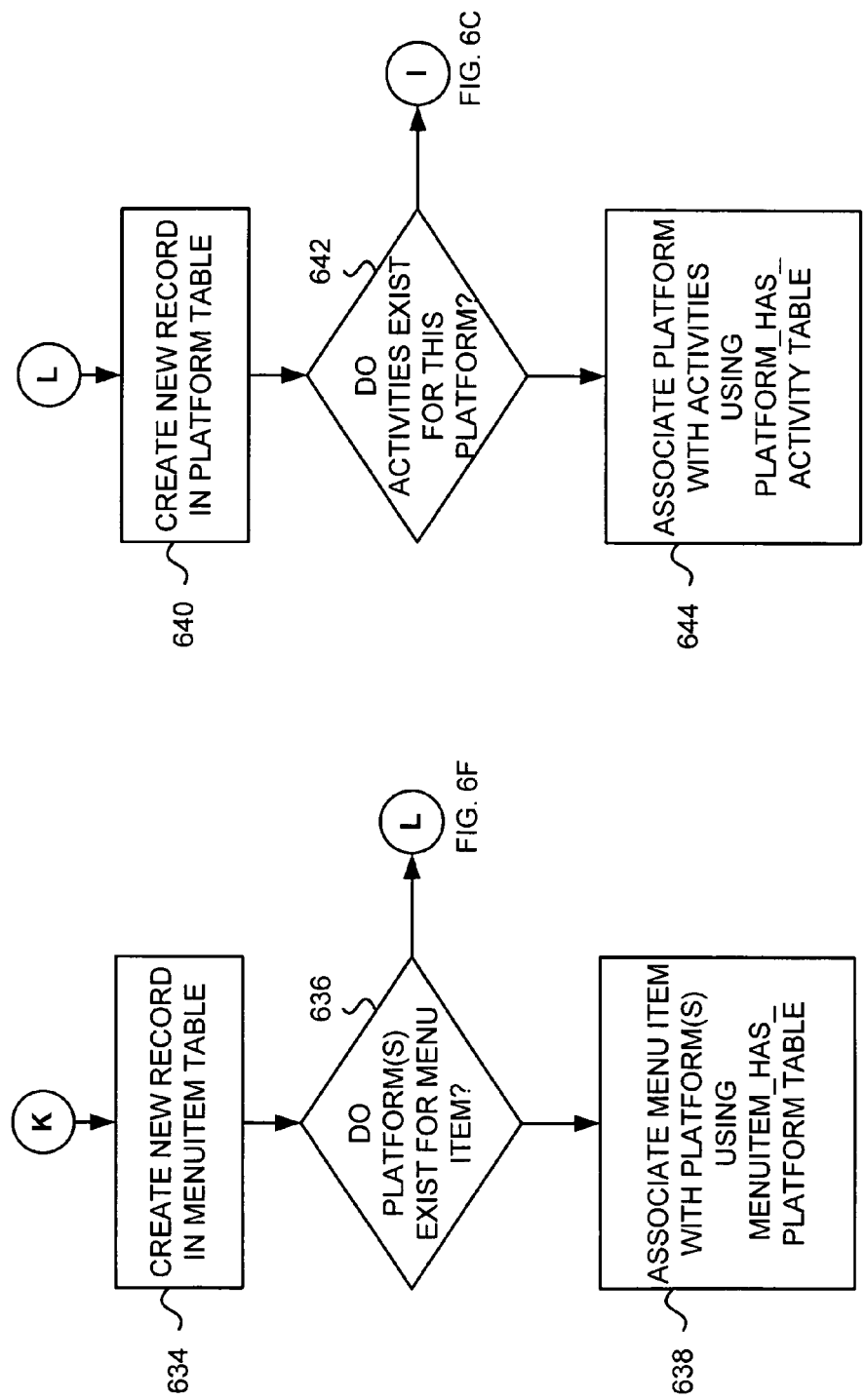

PROFILE-BASED USER ACCESS TO A NETWORK MANAGEMENT SYSTEM

FIELD OF THE INVENTION

Implementations consistent with the principles of the invention relate generally to communications networks and, more particularly, to management of a communications network.

BACKGROUND OF THE INVENTION

Networks typically include many different types of devices. For example, a typical network may include tens to hundreds of routers, switches, gateways, servers, etc. that aid in transporting data from a source to a destination. Changing the configuration of these devices can be cumbersome task. For example, in many instances, the network devices are manually configured to reflect a change. This approach is very time consuming and error prone. In other instances, network devices are configured on a device by device basis using scripts. This approach is also time consuming and requires that the scripts be maintained by programmers.

SUMMARY OF THE INVENTION

In an implementation consistent with the principles of the invention, a system includes a relational database and processing logic. The relational database is configured to define a relationship between users and a group of device groups to which the users are permitted access. The processing logic is configured to receive identification information from a user, identify one or more device groups using the relational database and the user identification information, construct a first graphical user interface using the one or more device groups, and provide the first graphical user interface to the user.

In another implementation consistent with the principles of the invention, a method includes receiving user identification information; identifying one or more items based on the user identification information and using a relational database; building a first graphical user interface, where the first graphical user interface includes the one or more items; and providing the first graphical user interface to the user.

In yet another implementation consistent with the principles of the invention, a system includes a relational database configured to define a first relationship between a user and groups of devices to which the user is permitted access and a second relationship between the user and a group of logical activities that the user is permitted to perform; and logic to construct graphical user interfaces using the first relationship and the second relationship. The graphical user interfaces allow the user to perform the group of logical activities on the groups of devices.

In still another implementation consistent with the principles of the invention, a method includes providing a relational database that stores a first set of tables that associate a user with groups of devices, a second set of tables that associate the user with a first group of logical activities that the user is permitted to perform, and a third set of tables that associate the groups of devices with a second group of logical activities that is permitted to be performed on the groups of devices. The method further includes receiving information identifying the user; retrieving information identifying the groups of devices using the information identifying the user and the first set of tables; constructing a first graphical user interface, where the first graphical user interface includes the information identifying the groups of devices; receiving selection of one group of devices of the groups of devices; retrieving information identifying one or more logical activities from the relational database using the selected one group of devices, the second set of tables, and the third set of tables; and constructing a second graphical user interface, where the second graphical user interface includes the information identifying the one or more logical activities and permits the user to perform the one or more logical activities on at least one device in the selected one group of devices.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 6A-6H illustrate an exemplary process for adding a new user to the database of FIG. 5 in an implementation consistent with the principles of the invention;

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the principles of the invention dynamically build graphical user interfaces for a user based on the user's profile stored in a relational database. The graphical user interfaces provide only that information that is relevant to the user, thereby facilitating the user's ability to traverse the graphical user interfaces. Using the graphical user interfaces, the user may perform a logical activity on one or more devices.

Exemplary System

Figure 1:
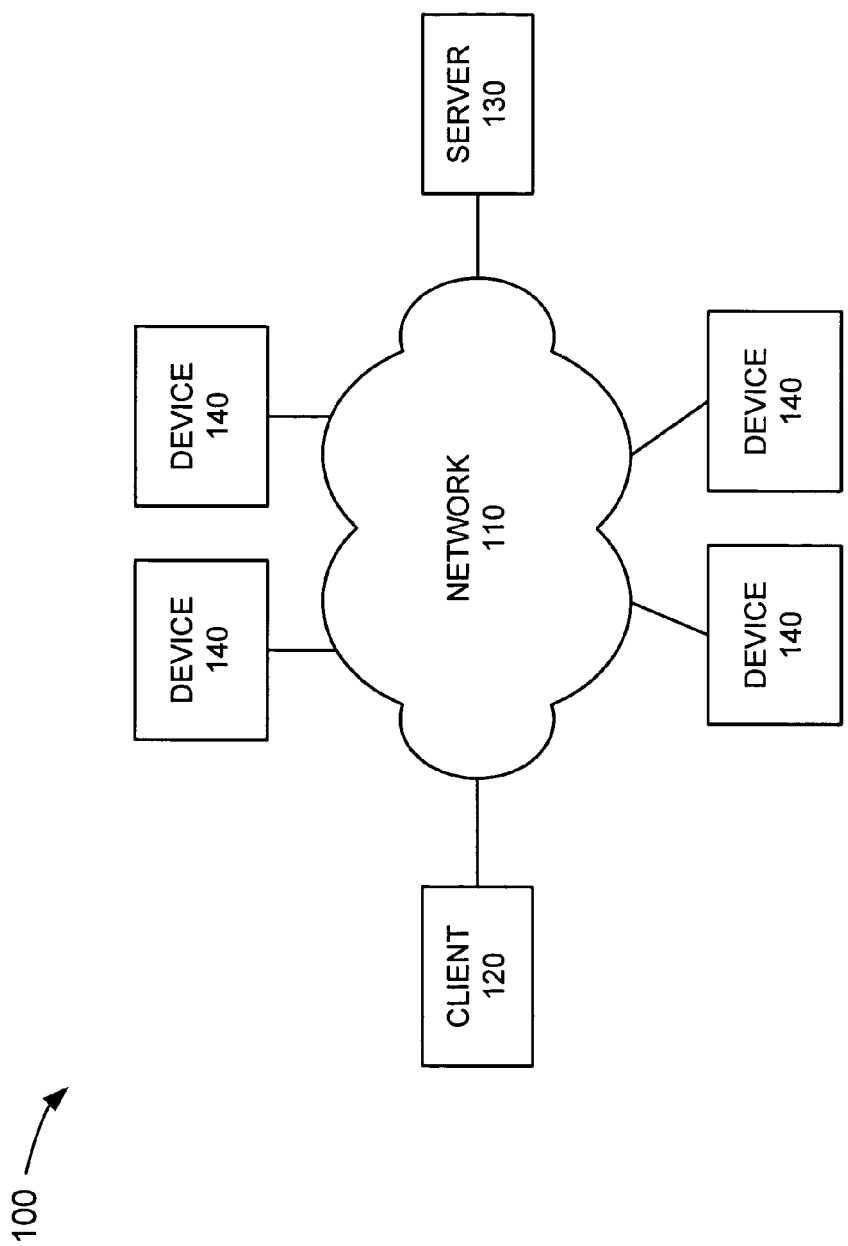
FIG. 1 illustrates an exemplary system in which systems and methods, consistent with the principles of the invention, may be implemented.

FIG. 1 illustrates an exemplary system 100 in which systems and methods, consistent with the principles of the invention, may be implemented. As illustrated, system 100 may include a client 120, a server 130, and a group of devices that connect via a network 110. The number of clients, servers, and devices illustrated in FIG. 1 is provided for simplicity. In practice, a typical system could include more or fewer clients, servers, and devices than illustrated in FIG. 1.

Network 110 may include a local area network (LAN), a wide area network (WAN), a telephone network, such as the Public Switched Telephone Network (PSTN), an intranet, the Internet, or a combination of these or other networks.

Client 120 may include a device, such as a personal computer, a mainframe computer, a server, a lap top, a personal digital assistant (PDA), a wireless telephone, etc., one or more threads or processes running on these devices or other types of devices, and/or one or more objects executable by these devices. In one implementation, client 120 may allow a user to configure different types of devices, such as devices 140, on a network, such as network 110. Client 120 may connect to network 110 via any technique, such as wired, wireless, or optical connections.

Server 130 may include one or more one or more types of computer systems, such as a mainframe, minicomputer, or personal computer. In one implementation consistent with the principles of the invention, server 130 may store or be associated with a database that describes relationships between logical activities and the physical commands needed to perform those logical activities. Server 130 may receive change requests from client 120 and automatically configure devices 140 based on the change requests. Server 130 may connect to network 110 via any technique, such as wired, wireless, or optical connections.

Devices 140 may include any type of device with which server 130 can communicate. For example, devices 140 may include network devices having Internet Protocol (IP) addresses, such as servers, switches, routers, etc. Devices 140 may connect to network 110 via any technique, such as wired, wireless, or optical connections.

Exemplary Client Configuration

Figure 2:
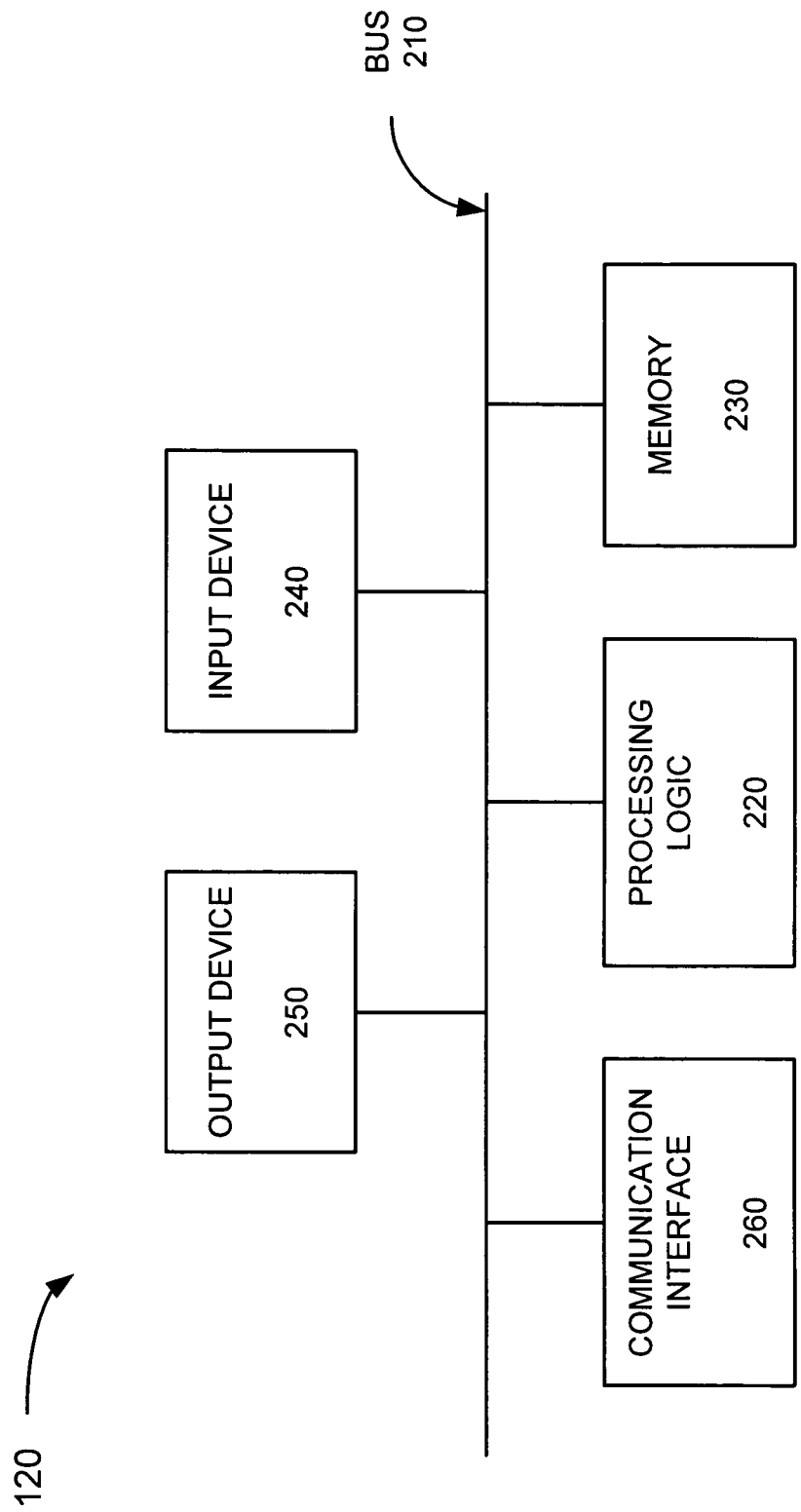
FIG. 2 illustrates an exemplary configuration of the client of FIG. 1 in an implementation consistent with the principles of the invention.

FIG. 2 illustrates an exemplary configuration of client 120 in an implementation consistent with the principles of the invention. As illustrated, client 120 may include a bus 210, processing logic 220, a memory 230, an input device 240, an output device 250, and a communication interface 260. It will be appreciated that client 120 may include other components (not shown) that aid in receiving, transmitting, and/or processing data. Moreover, it will be appreciated that other configurations are possible.

Bus 210 may permit communication among the components of client 120. Processing logic 220 may include any type of processor or microprocessor that interprets and executes instructions. In other implementations, processing logic 220 may be implemented as or include an application specific integrated circuit (ASIC), field programmable gate array (FPGA), or the like. Memory 230 may include a random access memory (RAM) or another type of dynamic storage device that stores information and instructions for execution by processing logic 220, a read only memory (ROM) or another type of static storage device that stores static information and instructions for the processing logic 220, and/or some other type of magnetic or optical recording medium and its corresponding drive for storing information and/or instructions.

Input device 240 may include a device that permits a user to input information to client 120, such as a keyboard, a keypad, a mouse, a pen, a microphone, one or more biometric mechanisms, and the like. Output device 250 may include a device that outputs information to the user, such as a display, a printer, a speaker, etc.

Communication interface 260 may include any transceiver-like mechanism that enables client 120 to communicate with other devices and/or systems. For example, communication interface 260 may include mechanisms for communicating with server 130 via a network, such as network 110.

Figure 3:
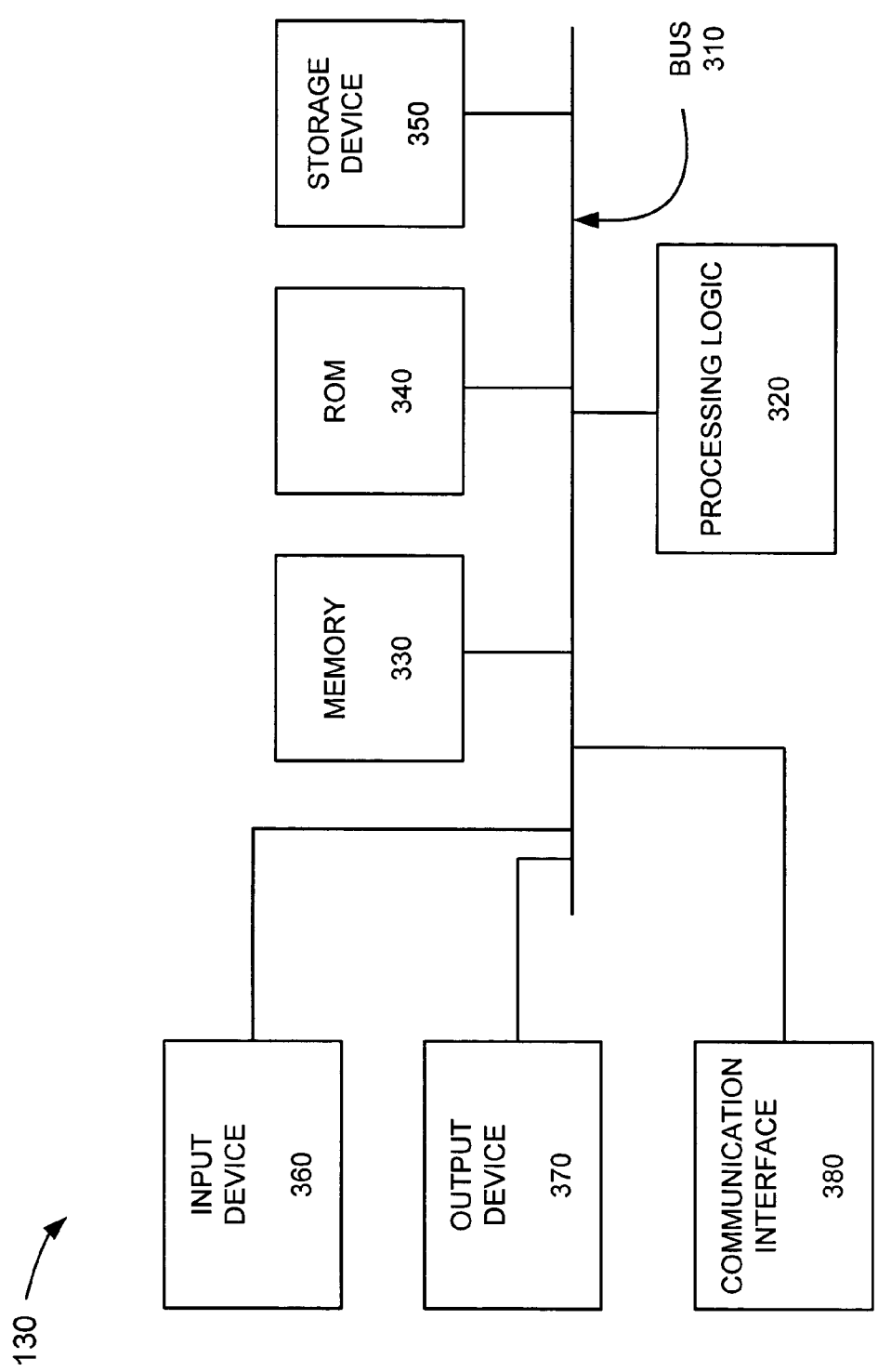
FIG. 3 illustrates an exemplary configuration of the server of FIG. 1 in an implementation consistent with the principles of the invention.

As will be described in detail below, client 120, consistent with the principles of the invention, may allow a user to configure a group of devices, such as devices 140. Client 120 may perform these and other services in response to processing logic 220 executing software instructions contained in a computer-readable medium, such as memory 230. A computer-readable medium may be defined as one or more memory devices and/or carrier waves. The software instructions may be read into memory 230 from another computer-readable medium or from another device via communication interface 260. The software instructions contained in memory 230 may cause processing logic 220 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software Exemplary Server Configuration FIG. 3 illustrates an exemplary configuration of server 130 in an implementation consistent with the principles of the invention. As illustrated, server 130 may include a bus 310, processing logic 320, a memory 330, a ROM 340, a storage device 350, an input device 360, an output device 370, and a communications interface 380. It will be appreciated that server 130 may include other components (not shown) that aid in receiving, transmitting, and/or processing data.

Bus 310 may permit communication among the components of server 130. Processing logic 320 may include any type of processor or microprocessor that interprets and executes instructions. In other implementations, processing logic 320 may be implemented as or include an ASIC, FPGA, or the like. Memory 330 may include a RAM or another type of dynamic storage device that stores information and instructions for execution by processing logic 220. ROM 340 may include a ROM device and/or another type of static storage device that stores static information and instructions for the processing logic 320. Storage device 350 may include some other type of magnetic or optical recording medium and its corresponding drive for storing information and/or instructions.

Input device 360 may include a device that permits an operator to input information to server 130, such as a keyboard, a keypad, a mouse, a pen, a microphone, one or more biometric mechanisms, and the like. Output device 370 may include a device that outputs information to the operator, including a display, a printer, a speaker, etc.

Communication interface 380 may include any transceiver-like mechanism that enables server 130 to communicate with other devices and/or systems. For example, communication interface 380 may include mechanisms for communicating with another device or system via a network, such as network 110.

As will be described in detail below, server 130, consistent with the principles of the invention, may receive requests from client 120 and automatically configure devices 140 in response to the requests. Server 130 may perform these and other services in response to processing logic 320 executing software instructions contained in a computer-readable medium, such as memory 330. The software instructions may be read into memory 330 from another computer-readable medium, such as data storage device 350, or from another device via communication interface 380. The software instructions contained in memory 330 may cause processing logic 320 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Figure 4:
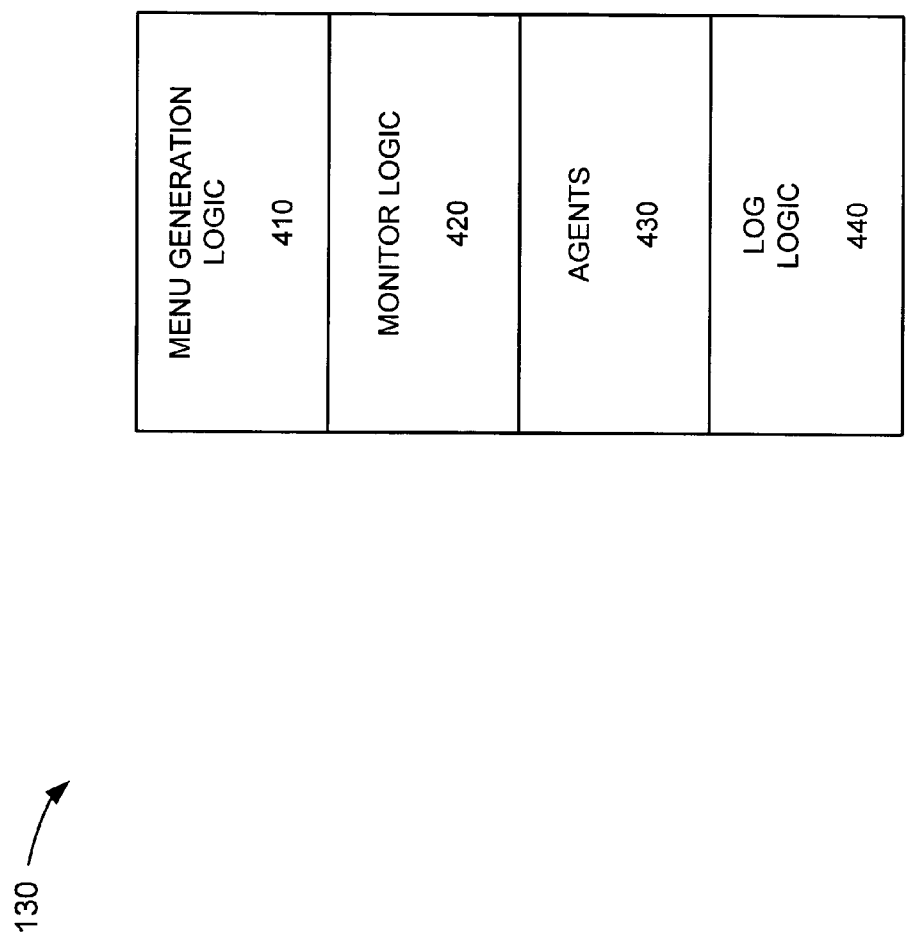
FIG. 4 illustrates an exemplary functional block diagram of the server of FIG. 1 in an implementation consistent with the principles of the invention.

FIG. 4 illustrates an exemplary functional block diagram of server 130 in an implementation consistent with the principles of the invention. As illustrated, server 130 may include menu generation logic 410, monitor logic 420, agents 430, and log logic 440. It will be appreciated that server 130 may include other functional components than are illustrated in FIG. 4 that aid in receiving, processing, and/or transmitting data.

Menu generation logic 410 may dynamically build graphical user interfaces based on a user's profile. For example, if a particular user is authorized to only perform a certain activity, menu generation logic 410 may build a graphical user interface for that user that only gives the user the option to perform that activity. Menu generation logic 410 may cause dynamically-built graphical user interfaces to be forwarded to a client, such as client 120. Menu generation logic 410 may be implemented in software and/or hardware.

Monitor logic 420 may act as the interface between server 130 and client 120. Monitor logic 420 may receive requests from client 120 and forward those requests to the appropriate agents 430 for processing. Monitor logic 420 may also forward graphical user interfaces generated by menu generation logic 410 to client 120. Monitor logic 420 may be implemented in software and/or hardware.

Agents 430 store information regarding how to communicate with each of devices 140. Agents 430 receive data from monitor logic 420 in response to received requests and cause changes to be made to devices 140 based on the received data. Agents 430 may be implemented in software and/or hardware.

Log logic 440 receives data from monitor logic 420 and agents 430 and stores this information into a log. Log logic 440 tracks all activities that are performed on devices 140. In one implementation consistent with the principles of the invention, the tracked information may include every piece of information that is transmitted to and received from devices 140 as part of performing an activity on devices 140, as well as information relating to the received activity request and the physical commands and parameters into which the received request is converted.

Figure 5:
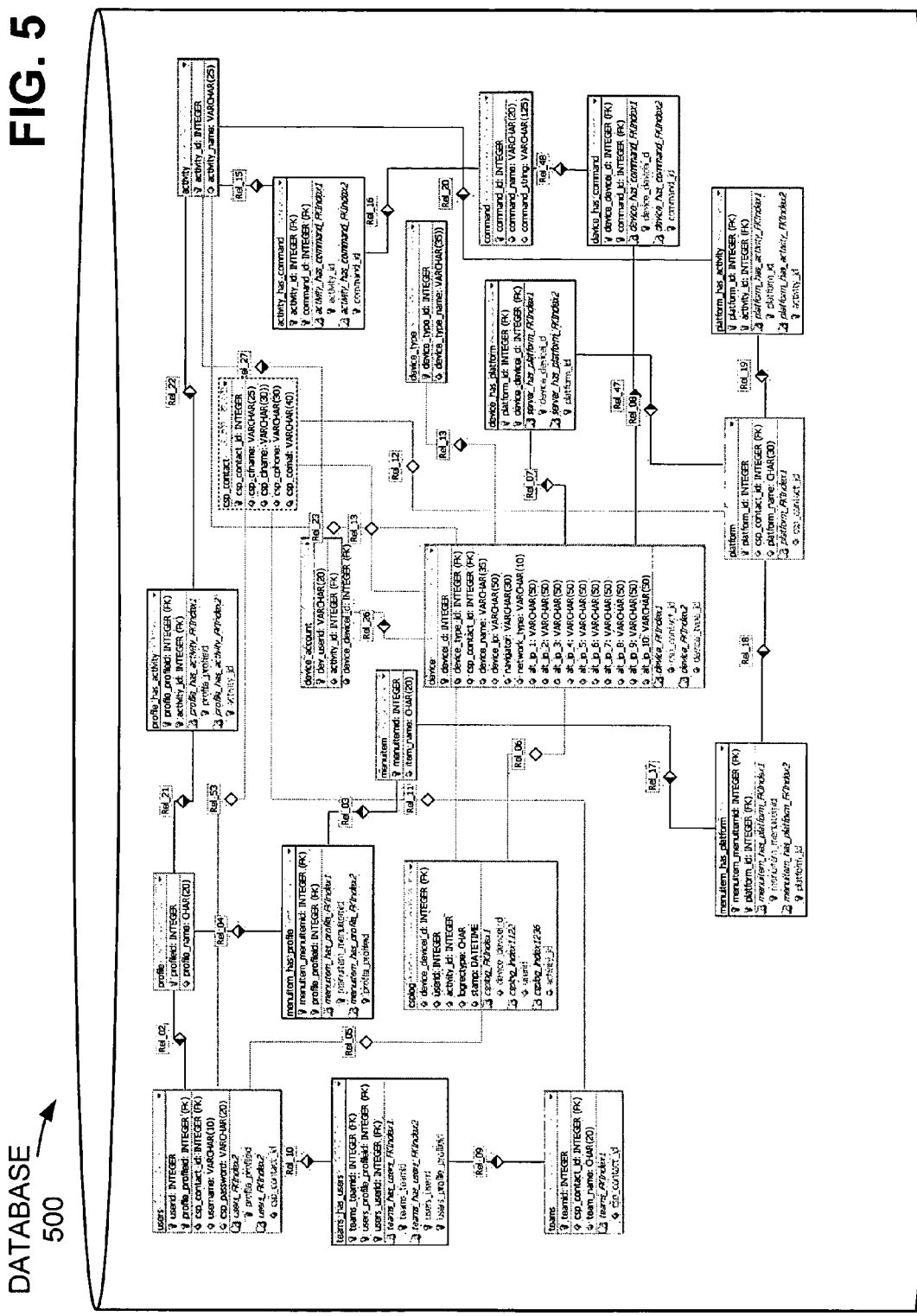
FIG. 5 illustrates an exemplary diagram of a first database that may be associated with the server of FIG. 1 in an implementation consistent with the principles of the invention.

FIG. 5 illustrates an exemplary diagram of a first database 500 that may be associated with server 130 in an implementation consistent with the principles of the invention. While only one database is described below, it will be appreciated that database 500 may consist of multiple databases stored locally at server 130 (e.g., in memory 330 or storage device 350), or stored at one or more locations throughout network 110.

In one implementation consistent with the principles of the invention, database 500 may include a group of individual tables that are configured to store information relating to users, network devices, and activities that may be performed by the users on the network devices. In one implementation, database 500 may be formed as a relational database, where each table connects to one or more other tables in a one-to-one or one-to-many manner. Each table in database 500 may include a key. A key in a relational database is a field or a combination of fields in a table that uniquely identifies a record in the table or references a record in another table. There are typically two types of keys: a primary key and a foreign key. A primary key uniquely identifies a record within a table. In other words, each record in a table is uniquely identified by one or more fields making up its primary key. A foreign key is a field or a combination of fields in one table whose values match those of a primary key of another table.

As illustrated, database 500 may include the following exemplary tables: a users table, a teams table, a team_has_users table, a profile table, a profile_has_activity table, an activity table, an activity_has_command table, a command table, a platform table, a platform_has_activity table, a device table, a device_account table, a device_has_platform table, a device_type table, a device_has_command table, a central security platform (CSP) contact table, a menuitem table, a menuitem_has profile table, a menuitem_has_platform table, and a csp_jog table. The types and number of tables illustrated in FIG. 5 is provided for explanatory purposes only. It will be appreciated that database 500 may include more or fewer tables than illustrated in FIG. 5. Also, it will be appreciated that the contents of each of the tables is provided for explanatory purposes only.

The users table stores user names (username) and passwords (csp_password) for users that are authorized to access server 130. The user table may also store a user identifier (userid), which is a unique primary key identifier for a user, a foreign key that points to a specific profile in the profile table (profile_profileid) with which the user is associated, and a foreign key that points to a specific contact person in the csp_contact table (csp_contact_id) with which the user is associated.

The teams table identifies all of the teams within system 100. A team is a logical grouping of users. As an example, one team may be called a switch team, which would include those users associated with switch devices in system 100. Other examples of teams could include a data team and a midrange team that includes users associated with data devices and midrange devices in system 100. The teams table may include a unique primary key identifier for a team (teamid), a descriptive identifier for the team (team_name), and a foreign key (csp_contact_id) that points to a specific contact person within csp_contact table.

The teams_has_users table may associate a user with a team in the teams table and with a profile in the profile table. As illustrated, the teams_has_users table may store a foreign key that points to a specific team within the teams table (teams_teamsid), a foreign key that points to a specific profile within the profile table (user_profile_profileid), and a foreign key that points to a specific user within the users table (users_userid).

The profile table may store a profile for each user identified in the users table. Each profile may be associated with one or more activities that may be performed by the user with which the profile is associated. As illustrated, the profile table may store a unique primary key identifier (profileid) for a profile and a descriptive identifier (profile_name) for the profile.

The profile_has_activity table may identify activities for a profile. An activity is a logical collection of device 140 commands. Examples of activities may include "Add User," "Delete User," "Change Password," etc. The profile_has_activity may store a foreign key that points to a profile within the profile table (profile_profileid) and a foreign key that points to a specific activity within the activity table (activity_id).

The activity table stores the activities that may be performed in system 100. As indicated above, the activities may include, for example, "Add User," "Delete User," "Change Password," or other types of activities. The activity table may store a unique primary key identifier (activity_id) for a logical activity and a descriptive identifier for the logical activity (activity_name).

A logical activity may translate into one or more physical commands formulated in the native syntax of the destination device 140. The activity_has_command table provides the relationship between the commands and the activities with which the commands are associated. As illustrated, the activity_has_command table may store a foreign key that points to a specific activity within the activity table (activity_id) and a foreign key that points to a specific command within the command table (command_id).

The command table may store a list of unique native device/element command strings. Groups of commands are used to implement the logical activities described in the activity table. As illustrated, the command table may store a unique primary key identifier (command_id) for a physical command and a descriptive identifier for the command (command_name). The command table may also store a string (command_string) that is a mixture of the native operating system syntax necessary to perform a command as well as keywords parsed by server 130 with data gathered from client 120.

A platform is a classification and logical grouping of devices 140 that perform a specific function. For example, one platform may include those devices that perform Voice over Internet Protocol (VoIP). Thus, a platform may include devices of different types. For example, the VoIP platform may include edge routers, core routers, gateways, etc.

The platform table may store a unique primary key identifier for a specific platform (platform_id), a foreign key that points to a specific contact person within the csp_contact table (csp_contact_id), and a descriptive identifier for the platform (platform_name).

The platform_has_activity table describes the logical activities that are valid for the different types of platforms. The platform_has_activity table may store a foreign key that points to a specific platform within the platform table (platform_id) and a foreign key that points to a specific activity within the activity table (activity_id).

The device table may store information needed to connect and login to each device 140 in system 100. The device table may store a unique primary key identifier (devicei_d) for each device 140, a foreign key that points to a specific device type within the device_type table (device_type_id), a foreign key that points to a specific contact person within the csp_contact table (csp_contact_id), a user-definable name for each device 140 (device_name), a network address for each device 140 (device_ip), a Navigator name that is used to access each device 140 (navigator), and information identifying the type of network with which each device 140 is associated (network_type). The device table may also store a number of alternative network addresses for each device 140 (alt_ip__1 to alt_ip__10).

The device_acount table defines the accounts on devices 140 that are used for gaining access to devices 140 to perform certain activities. For example, to perform a particular activity (e.g., delete a user) on a particular device, the user that is attempting to perform that activity may need to be logged into the device using a particular account, such as administrator, superuser, root, etc. If the same user is attempting to perform a different activity on the same device (e.g., adding a user), the user may need to be logged into the device using a different account. Thus, the device_account table may associate an account with each activity performed on a device. As illustrated, the device_account table may store a unique primary key identifier (dev_userid) for the account, a foreign key that points to a specific activity within the activity table (activity_id), and a foreign key that points to a specific device in the device table (device_devicei_d).

The device_has_platform table describes the relationship between a platform and the devices with which the platform is associated. As illustrated, the device_has_platform table may store a foreign key that points to a specific platform within the platform table (platform_id) and a foreign key that points to a specific device in the device table (device_devicei_d).

The device_type table describes a logical type of device within system 100. Examples of device types may include Unix, switch, digital cross connect (DXC), etc. As illustrated, the device_type table may store a unique primary key identifier for a device type (device_type_id) and a descriptive name for the device type (device_type_name).

The device_has_command table describes a relationship between devices 140 and commands. As illustrated, the device_has_command table may store a foreign key that points to a specific device within the device table (device_devicei_d) and a foreign key that points to a specific command in the command table (command_id).

The csp_contact table may store information to contact a person responsible for a resource, such as a platform, a device, a team, etc. As illustrated, the csp_contact table may store a unique primary key identifier for a contact person (csp_contact_id), a first name for the contact person (csp_cfname), a last name for the contact person (csp__clname), a telephone number for the contact person (csp_c-phone), and an e-mail address for the contact person (csp_cemail).

As will be described in greater detail below, server 130 may dynamically construct a graphical user interface that includes a menu for the user of client 120 based on the user's profile in the profile table. A menu item may be an item on a toolbar or other location within the graphical user interface on client 120, a field in the graphical user interface provided to client 120, etc. In one implementation consistent with the principles of the invention, each menu item may correspond to a different device type, a different platform, a different activity, or other element within database 500. As illustrated, the menuitem table may store a unique primary key identifier for a menu item (menuitemid) and a descriptive name for the menu item (item_name).

The menuitem_has_profile table describes the relationship between a particular menu item and a particular profile in the profile table. As illustrated, menuitem_has_profile table may store a foreign key that points to a specific menu item within the menuitem table (menuitem_menuitemid) and a foreign key that points to a specific profile within the profile table (profile_profileid).

The menuitem_has_platform table describes the relationship between a particular menu item and a particular platform in the platform table. As illustrated, menuitem_has_platform table may store a foreign key that points to a specific menu item within the menuitem table (menuitem_menuitemid) and a foreign key that points to a specific platform within the platform table (platform_id).

The csplog table records information identifying the activities that are performed on devices 140, information identifying devices 140 on which the activities are performed, and information identifying the users that performed those activities. As illustrated, the csplog table may store a foreign key that points to a specific device in the device table (device_devicei_d), a foreign key that points to a specific user in the users table (userid), a foreign key that points to a specific activity in the activity table (activity_id), and a timestamp (stamp) that indicates when the record was created. The csplog table may also store information identifying the type of log entry (logrectype), such as a start of a transaction, an end of a transaction, or other information regarding the transaction. Although not shown in FIG. 5, the csplog table may also store a transaction identifier that uniquely identifies each transaction performed by a user in system 100.

Exemplary Processing

FIGS. 6A-6H illustrate an exemplary process for adding a new user to database 500 in an implementation consistent with the principles of the invention. As described above, users include those persons permitted to perform activities on devices 140. It will be assumed hereinafter that the processing described in FIGS. 6A-6H is performed by a user (called "an individual" in the description of FIGS. 6A-6H so as to distinguish this user from the new user being added to database 500) at a client, such as client 120. In alternative implementations consistent with the principles of the invention, an individual may perform the acts described below at server 130 or another device in system 100.

Processing may begin by creating a record for the new user in the users table of database 500 (act 602). In one implementation consistent with the principles of the invention, a graphical user interface may be provided to the individual at client 120 that allows the individual to specify that a new record is to be created in the users table. The individual may then specify an identifier (userid) for the new user. The identifier may a unique character sequence. In an alternative implementation consistent with the principles of the invention, an identifier (userid) may be automatically generated for the new user (e.g., by server 130).

Other information regarding the new user may also be stored in the new record. For example, the individual may enter a descriptive name for the new user (username) and a password for the new user (csp_password).

Figure 6A:
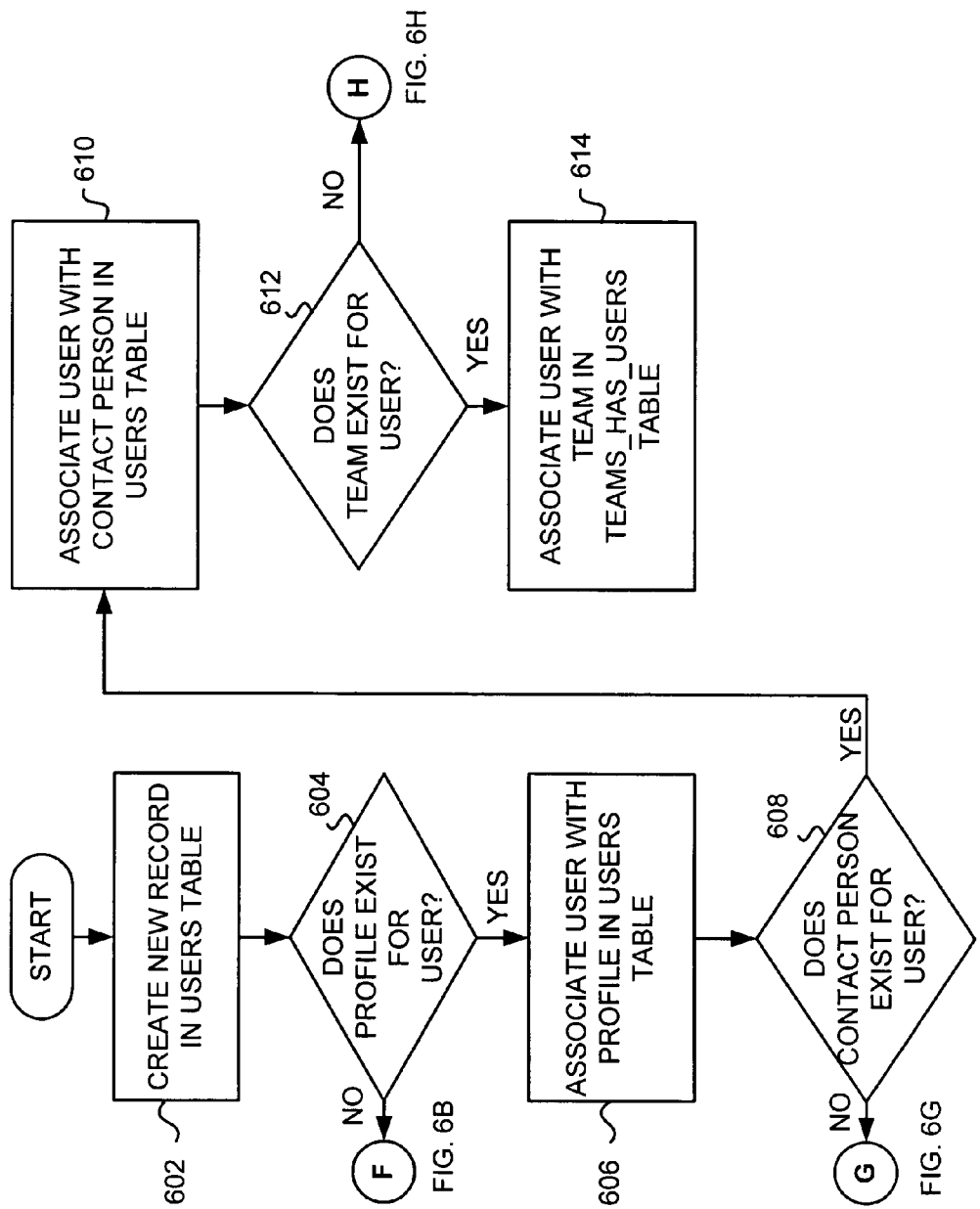
Figure 6B:
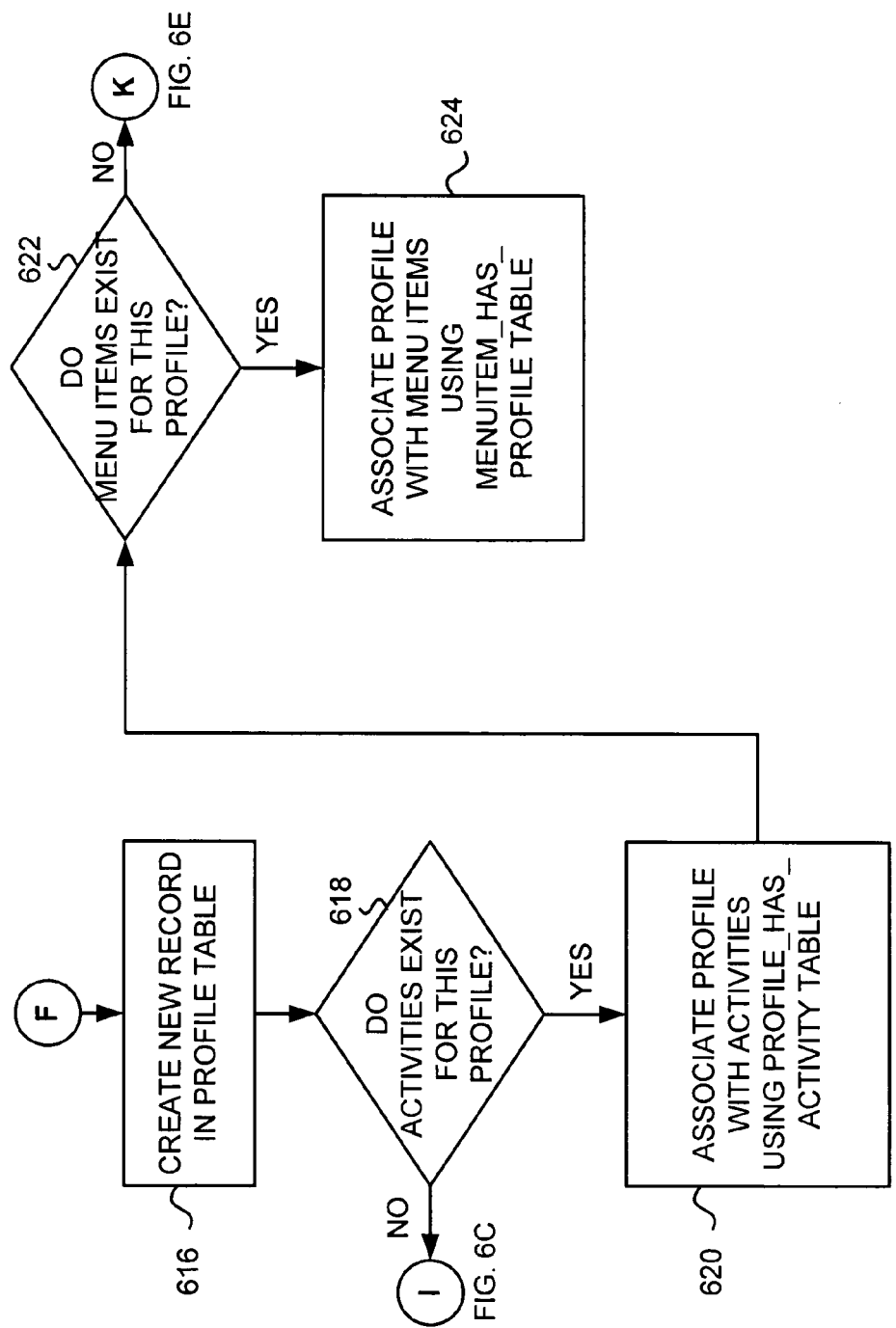

It may be determined whether a profile already exists for the new user (act 604). A profile may already exist for the new user in those situations, for example, where the new user's access privileges are to be identical to the access privileges of another user, such as a co-worker. If a profile does not already exist for the new user, a new record may be created in the profile table (act 616) (FIG. 6B). To create the new record in the profile table, the individual may specify an identifier (profileid) for the new profile in the profile table. The identifier may include a unique character sequence. In an alternative implementation consistent with the principles of the invention, an identifier (profileid) may be automatically generated for the new profile (e.g., by server 130). In addition to the profile identifier, a descriptive name may be specified for the new profile (profile_name).

It may be determined whether the activities that are permitted to be performed for the new profile have been pre-defined (act 618). If an activity that is permitted to be performed for the new profile has not be pre-defined (act 618), a new record may be created in the activity table (act 626) (FIG. 6C). To create the new record in the activity table, the individual may specify an identifier (activity_id) for the new activity in the activity table. The identifier may include a unique character sequence. In an alternative implementation consistent with the principles of the invention, an identifier (activity_id) may be automatically generated for the new activity (e.g., by server 130). In addition to the activity identifier, a descriptive name may be specified for the new activity (activity_name).

It may be determined whether the physical command strings that will be used to perform the new activity exist (act 628). If so, the new activity may be associated with the pre-defined commands (act 630). In one implementation consistent with the principles of the invention, the new activity may be associated with the pre-defined commands by associating the new activity's identifier (activity_id) with the identifiers for the pre-defined commands (command_id) in the activity_has_command table.

If, on the other hand, the physical command strings that will be used to perform the new activity do not already exist (act 628), one or more new records may be created in the command table (act 632) (FIG. 6D). To create the new record (s) in the command table, the individual may associate a physical command string (command_string) with each new command. As set forth above, the physical command string may be in the native syntax of each device on which the command may be performed. Moreover, the physical command string may include locations for variable substitution, as may be required to perform the new command. In addition to the command string, a descriptive name may be specified for each new command (command_name).

Returning to FIG. 6B, if the activities that are permitted to be performed for the new profile already exist (act 618), the new profile may be associated with the pre-defined activities (act 620). In one implementation consistent with the principles of the invention, the new profile may be associated with the pre-defined activities by associating the new profile's identifier (profileid) with the identifiers for the pre-defined activities (activity_id) in the profile_has_activity table.

It may be determined whether one or more menu items for the new profile have been pre-defined (act 622). If a menu item for the new profile has not been pre-defined (act 622), a new record may be created in the menuitem table (act 634) (FIG. 6E). To create the new record in the menuitem table, the individual may specify an identifier (menuitemid) for the new menu item in the menuitem table. The identifier may include a unique character sequence. In an alternative implementation consistent with the principles of the invention, an identifier (menuitemid) may be automatically generated for the new menu item (e.g., by server 130). In addition to the menu item identifier, a descriptive name may be specified for the new menu item (item_name).

It may be determined whether a platform exists for the new menu item (act 636). If so, the new menu item may be associated with the platform (act 638). In one implementation consistent with the principles of the invention, the new menu item may be associated with the platform by associating the new menu item's identifier (menuitemid) with the identifiers for the platforms (platform_id) in the menuitem_has_platform table.

If, on the other hand, a platform does not exist for the new menu item (act 636), a new record may be created in the platform table (act 640) (FIG. 6F). To create the new record in the platform table, the individual may specify an identifier (platform_id) for the new platform in the platform table. The identifier may include a unique character sequence. In an alternative implementation consistent with the principles of the invention, an identifier (platform_id) may be automatically generated for the new platform (e.g., by server 130). In addition to the platform identifier, a descriptive name may be specified for the new platform (platform_name).

It may be determined whether the activities that may be performed on this platform have been pre-defined (act 642). If so, the new platform may be associated with the pre-defined activities (act 644). In one implementation consistent with the principles of the invention, the new platform may be associated with the pre-defined activities by associating the new platform's identifier (platform_id) with the identifiers for the pre-defined activities (activity_id) in the platform_has_activity table.

It may be determined whether the physical command strings that will be used to perform the new activity exist (act 628). If so, the new activity may be associated with the pre-defined commands (act 630). In one implementation consistent with the principles of the invention, the new activity may be associated with the pre-defined commands by associating the new activity's identifier (activity_id) with the identifiers for the pre-defined commands (command_id) in the activity-_has_command table.

If, on the other hand, the physical command strings that will be used to perform the new activity do not already exist (act 628), one or more new records may be created in the command table (act 632) (FIG. 6D). To create the new record (s) in the command table, the individual may associate a physical command string (command_string) with each new command. As set forth above, the physical command string may be in the native syntax of each device on which the command may be performed. Moreover, the physical command string may include locations for variable substitution, as may be required to perform the new command. In addition to the command string, a descriptive name may be specified for each new command (command_name).

Returning to FIG. 6B, if a menu item for the new profile has been pre-defined (act 622), the new profile may be associated with the menu item (act 624). In one implementation consistent with the principles of the invention, the new profile may be associated with the menu item by associating the profile's identifier (profileid) with the identifier for the menu item (menuitemid) in the menuitem_has_profile table.

Returning to FIG. 6A, if a profile already exists for the new user, the profile may be associated with the new user (act 606). In one implementation consistent with the principles of the invention, the profile may be associated with the new user by associating the profile's identifier (profileid) with the identifier for the new user (userid) in the users table.

It may be determined whether the new user is associated with an existing contact person (act 608). If the new user is not associated with an existing contact person, a new record may be created in csp_contact table (act 646) (FIG. 6G). To create the new record, the individual may specify an identifier (csp-_contact_id) for the new contact person in the csp_contact table. The identifier may include a unique character sequence. In an alternative implementation consistent with the principles of the invention, an identifier (csp_contact_id) may be automatically generated for the new contact person (e.g., by server 130). In addition to the contact person identifier, the contact person's first and last names (csp_cfname, csp-_clname) and contact information may be specified, such as, for example, a telephone number (csp_cphone) and/or e-mail address (csp_cemail).

Returning to FIG. 6A, if the new user is associated with an existing contact person (act 608), the new user may be associated with the contact person (act 610). For example, in one implementation, the identifier of the contact person (csp_contact_id) may be associated with the identifier for the new user (userid) in the users table.

It may be determined whether the new user is associated with an existing team (act 612). If so, the new user may be associated with the team at server 130 (act 614). For example, in one implementation, the identifier of the team (teamid) may be associated with the identifier for the new user (userid) in the teams_has_users table.

Figure 6H:
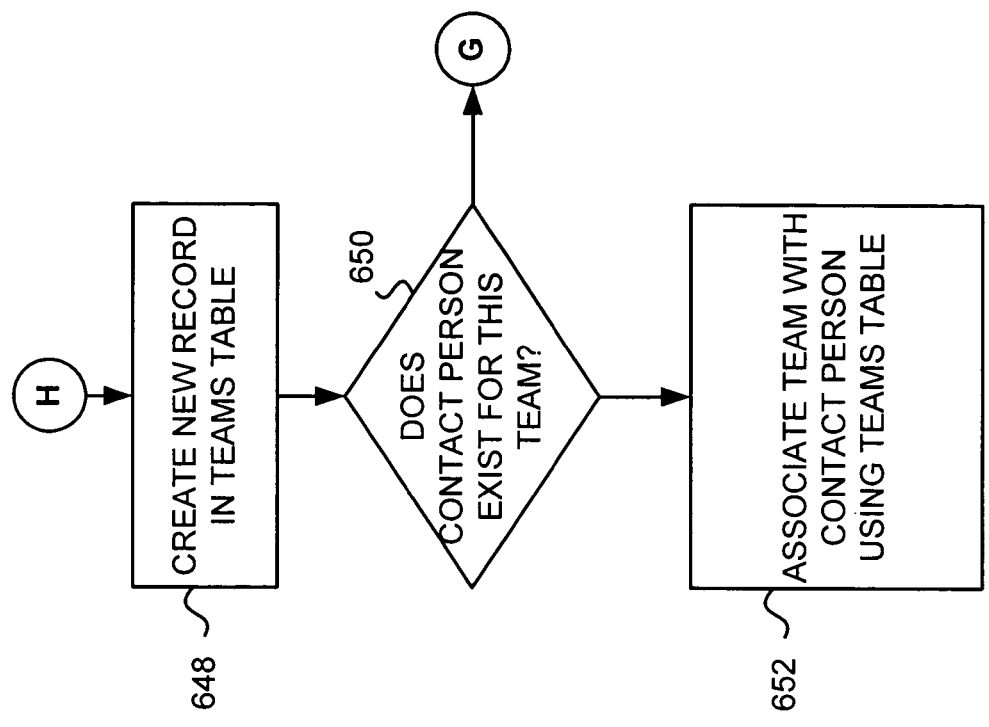
Figure 6G:
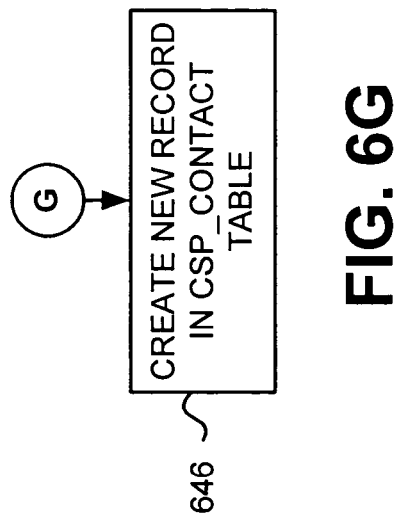

If the new user is not associated with an existing team, a new record may be created for the team (act 648) (FIG. 6H). To create the new record, the individual may specify an identifier (teamid) for the new team in the teams table. The identifier may include a unique character sequence. In an alternative implementation consistent with the principles of the invention, an identifier (teamid) may be automatically generated for the new contact person (e.g., by server 130). In addition to the team identifier, the descriptive name may be specified for the team (team_name).

It may be determined whether the new team is associated with an existing contact person (act 650). If so, the team may be associated with the contact person (act 652). For example, in one implementation, the identifier of the contact person (csp_contact_id) may be associated with the identifier for the new team (teamid) in the teams table.

If the new team is not associated with an existing contact person, a new record may be created in csp_contact table (act 646) (FIG. 6G). To create the new record, the individual may specify an identifier (csp_contact_id) for the new contact person in the csp_contact table. The identifier may include a unique character sequence. In an alternative implementation consistent with the principles of the invention, an identifier (csp_contact_id) may be automatically generated for the new contact person (e.g., by server 130). In addition to the contact person identifier, the contact person's first and last names (csp_cfname, csp_clname) and contact information may be specified, such as, for example, a telephone number (csp_c-phone) and/or e-mail address (csp_cemail).

In this way, database 500 may be populated with new users. Each user may be associated with a profile, which, among other things, defines the logical activities that each new user is permitted to perform. Also, each user's profile may be associated with one or more menu items that may be used for dynamically constructing graphical user interfaces for each user.

Figure 7:
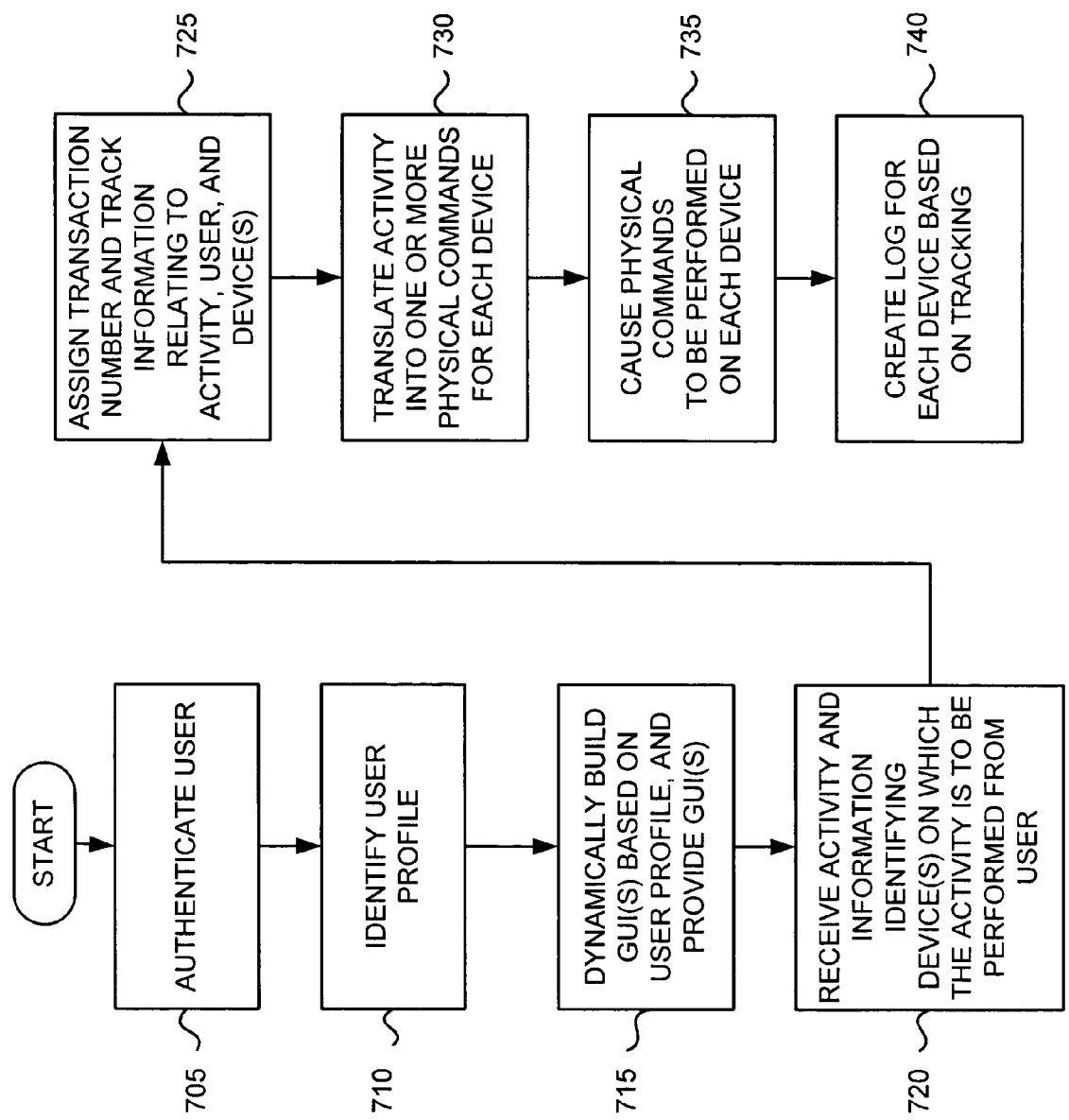
FIG. 7 illustrates an exemplary process for performing an activity on a device of FIG. 1 in an implementation consistent with the principles of the invention.
Figure 8:
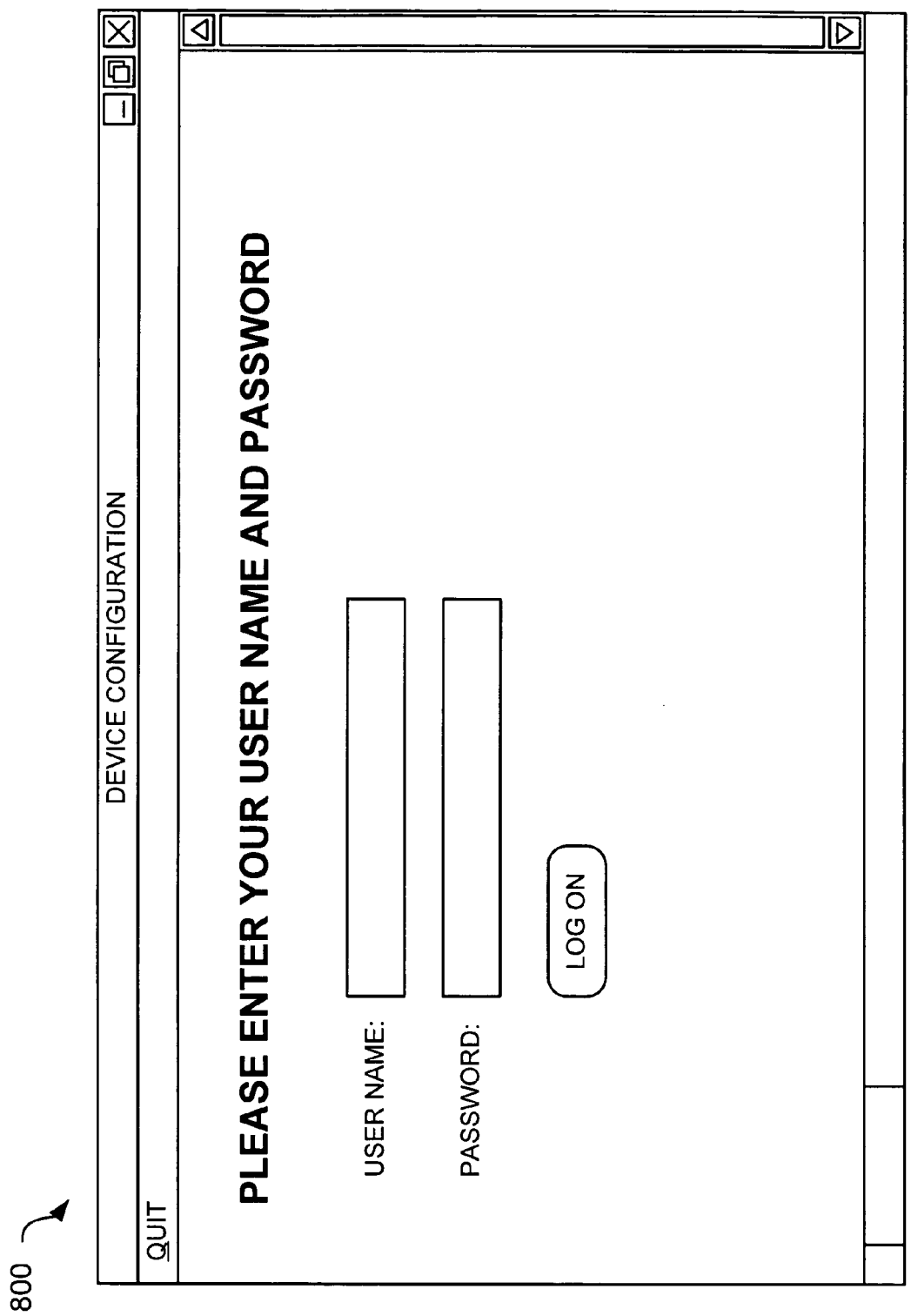
FIGS. 8-10 illustrate exemplary graphical user interfaces that may be provided to a user in an implementation consistent with the principles of the invention.

FIG. 7 illustrates an exemplary process for performing an activity on a device 140 in an implementation consistent with the principles of the invention. Processing may begin with server 130 authenticating a user (act 705). For example, server 130 may cause a graphical user interface to be presented to the user at a client, such as client 120. FIG. 8 illustrates an exemplary graphical user interface 800 that may be provided to a user in an implementation consistent with the principles of the invention. As illustrated, graphical user interface 800 may allow the user to enter a user name and password. By pressing the log on button, the user may cause the entered user name and password to be transmitted to server 130. Server 130 may authenticate the user by comparing the user name and password to user name and password combinations that have been stored in the users table of database 500.

If the user name and password match a stored user name and password for a particular user in the users table, server 130 may obtain the user's profile from database 500 (act 710). For example, server 130 may identify a profile for the user from the user's record in the users table. As set forth above, the user's profile not only identifies activities that the user is permitted to perform, but also identifies menu items that may be used to dynamically construct a graphical user interface for the user.

Server 130 may dynamically build a graphical user interface (GUI) for the user based on the user's profile (act 715). Server 130 may, for example, identify each menu item that is associated with the user's profile based on one or more tables from database 500. For example, in one implementation consistent with the principles of the invention, server 130 may identify the menu items to be used for building the graphical user interface using the menuitem_has_profile table in database 500, which describes the relationship between a profile and a menu item. In one implementation, as set forth above, the generation of the graphical user interface may be performed by menu generation logic 410 (FIG. 4). Presenting items in a graphical user interface that are relevant to the user (as determined by the user's profile) improves user satisfaction and the speed at which the user may traverse the graphical user interface since the dynamically-built interface eliminates the need for the user to sort through items that are irrelevant to the user, such as those items to which the user is not permitted access.

Once built, the graphical user interface may be provided to client 120 (act 715). The graphical user interface will include the identified menu items. The menu items may relate to platforms and/or device types that the user is permitted to access.

Figure 9:
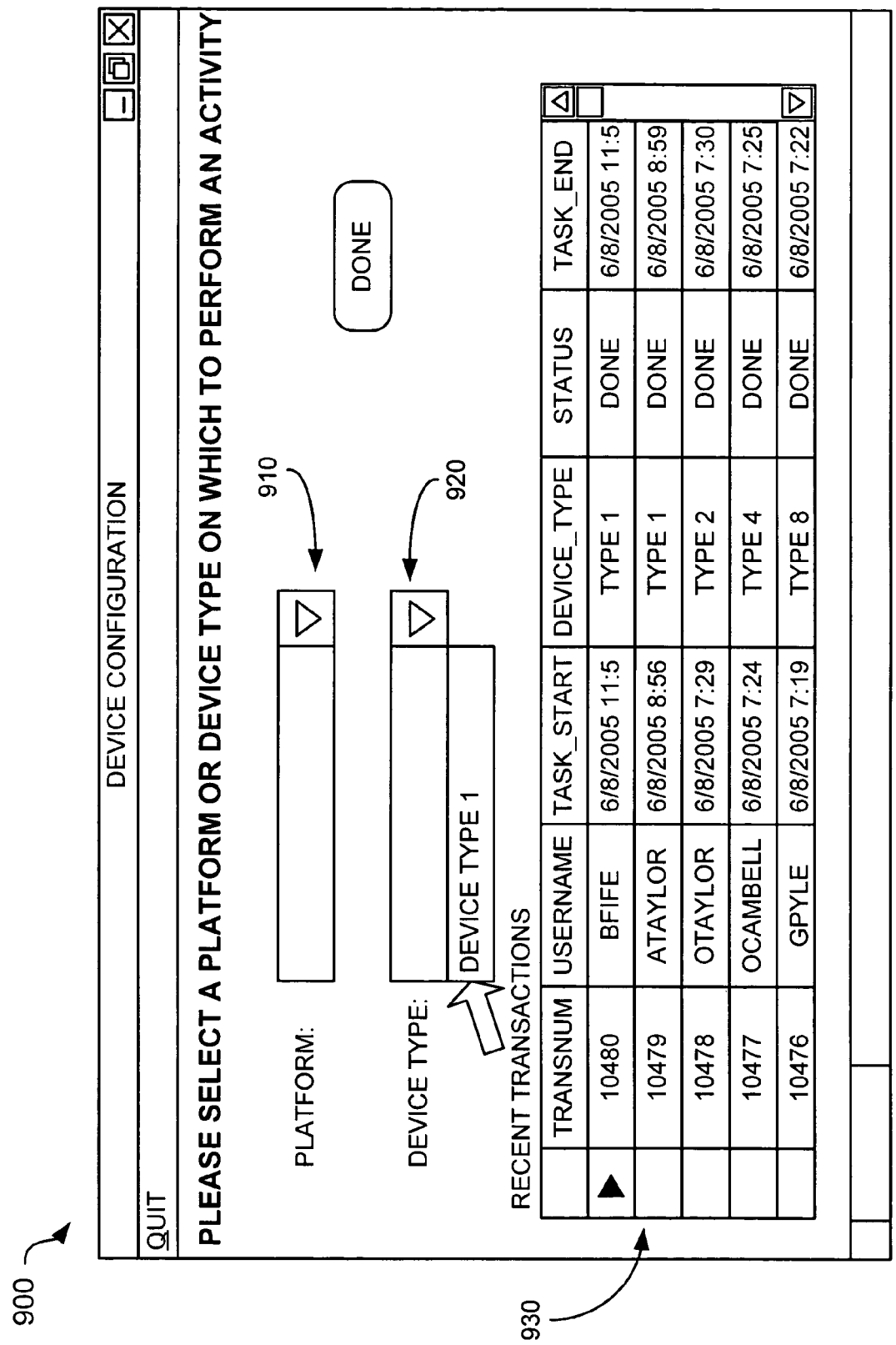

FIG. 9 illustrates an exemplary graphical user interface 900 that may be provided to client 120 in an implementation consistent with the principles of the invention. As illustrated, exemplary graphical user interface 900 may allow the user to specify a platform or device type on which to perform an activity via a platform pull-down menu 910 and a device type pull-down menu 920. Platform pull-down menu 910 may provide the user with a list of all of the platforms that the user is permitted to access. Platforms may include, for example, voice over Internet Protocol (VoIP), next generation service node (NGSN), or other logical groupings of devices that perform a specific function. If, for example, the user is only permitted access to the VoIP platform, only that platform will be listed in platform pull-down menu 910. Similarly, device type pull-down menu 920 may provide the user with a list of all device types that the user is permitted to access. Examples of device types may include switches, midrange devices, etc. In the example illustrated in FIG. 9, it is assumed that the user is only permitted to access DEVICE TYPE 1. Therefore, only that device type is listed in device type pull-down menu 920. While the use of pull-down menus 910 and 920 are described above for providing the identified menu items, it will be appreciated that the menu items may be provided in other ways. For example, the platform and device type menu items may be provided in a toolbar or other location in graphical user interface 900.

Graphical user interface 900 may also include a transaction window 930 that provides a list of recent activities that are in the process of being performed or have been performed in system 100. As illustrated, transaction window 930 may include the following exemplary fields: a transaction number (transnum) field, a user name (username) field, a task start field, a device type field, a status field, and a task end field. It will be appreciated that transaction window 930 may include more or fewer fields than illustrated in FIG. 9.

The transaction number field may store a transaction number that has been assigned to an activity that was performed in system 100. The user name field may store the name of the user that performed the activity. The task start field may store the date and time that the activity was started. The device type field may store information identifying the type of device on which the activity was performed. The status field may store information indicating the status of the activity. For example, the status field may indicate that the activity is in progress or has completed (or is done). The task end field may store the date and time that the activity was completed.

Via transaction window 930, a user may readily determine whether an activity has already been performed, when the activity was performed and by whom. Moreover, as will be described in greater detail below, transaction window 930 may allow a user to access a particular transaction (or activity) for troubleshooting or other purposes.

Once the user has identified the platform or device type on which to perform an activity, client 120 may transmit that information to server 130. In response, server 130 (or menu generation logic 410) may build a graphical user interface for the user based on one or more tables from database 500. For example, assume that the user identified VoIP under platform pull-down menu 910. Server 130 may access database 500 to determine the activities that may be performed on that platform by accessing, for example, the platform_has_activity table and possibly the profile_has_activity table (to determine whether the user has permission to perform the activities), the devices that are associated with that platform by accessing, for example, the device_has_platform table, and the accounts needed to access the devices associated with the platform by accessing, for example, the device_account table. Server 130 may use this information to dynamically build a graphical user interface for the user. Once built, the graphical user interface may be provided to client 120 via, for example, monitor logic 420 (FIG. 4).

Figure 10:
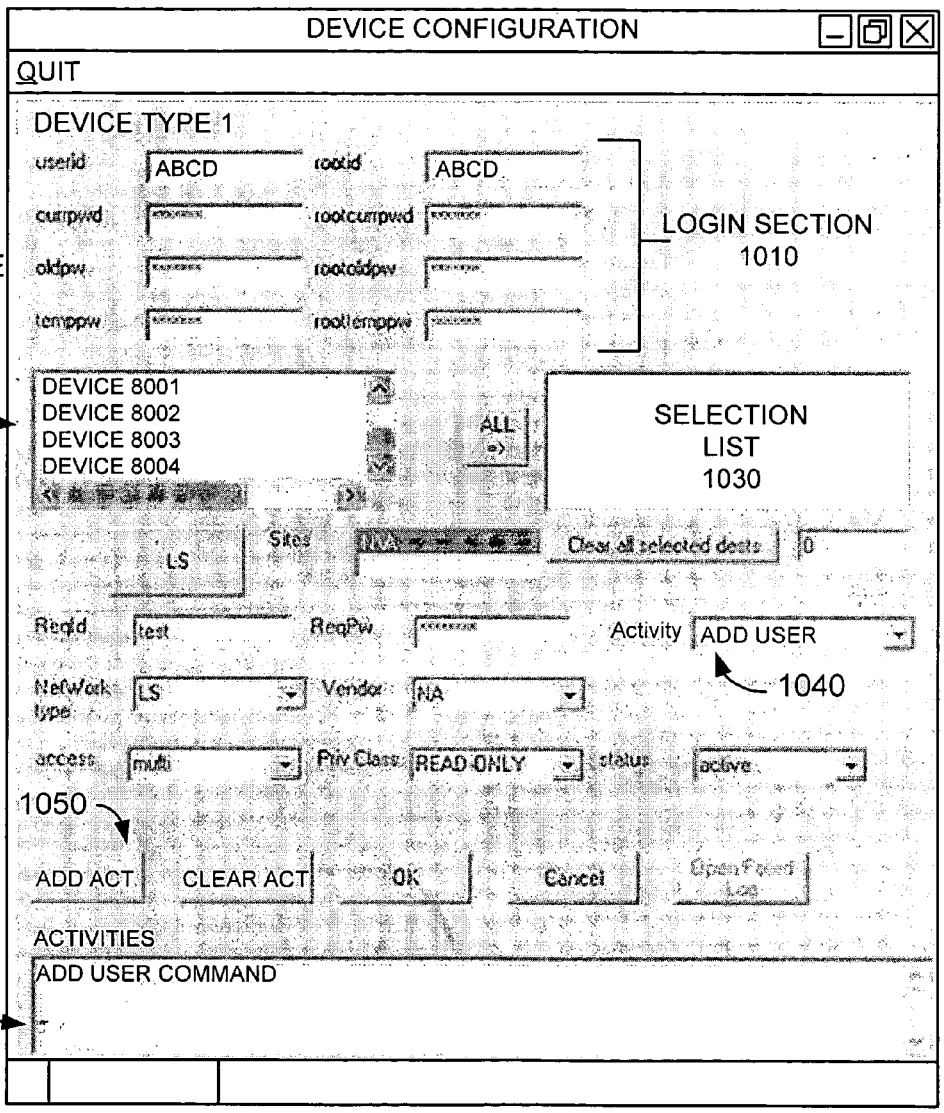

FIG. 10 illustrates an exemplary graphical user interface 1000 that may be provided to client 120 in an implementation consistent with the principles of the invention. Graphical user interface 1000 may allow the user to specify the activity to be performed and on what device(s) the activity will be performed. It is assumed for the example illustrated in FIG. 10 that the user has selected DEVICE TYPE 1 in graphical user interface 900. Graphical user interface 1000, therefore, has been dynamically built for the user to include only those devices associated with DEVICE TYPE 1 to which the user is permitted access and to include only those activities that the user is permitted to perform on the devices associated with DEVICE TYPE 1.

As illustrated, graphical user interface 1000 may include a login section 1010, a device list window 1020, a selection list window 1030, an activity pull-down menu 1040, an add activity (ACT) button 1050, and an activity list window 1060. Graphical user interface 1000 may include additional fields, pull-down menus, toolbar items, etc., as necessary, in order to capture all of the parameters needed for performing a desired activity on the devices of interest.

Login section 1010 may include one or more fields for entering user identification information and one or more fields for entering password information. As set forth above, each device may be associated with a device account that specifies the information needed to gain access to the device. Login section 1010 may include fields for receiving that information that is needed to gain access to devices 140 associated with DEVICE TYPE 1.

Device list window 1020 may include a list of all of the devices that are associated with DEVICE TYPE 1 that the user is permitted to access. In some instances, the list may include a few devices (e.g., 0-50). In other instances, the list may include hundreds or even thousands of devices. Via device list window 1020, the user may select those devices on which to perform an activity. To select a specific device, the user may, for example, double-click the desired device or drag the device from device list window 1020 to selection list window 1030. In those instances when the user wants to select all of the devices in device list window 1020, the user may select the "ALL" button, which would cause all of the devices listed in device list window 1020 to appear in selection list window 1030.

Selection list window 1030 may store a list of all of the devices on which an activity will be performed. Therefore, all of the devices that the user selects from device list window 1020 may be displayed in selection list window 1030.

Activity pull-down menu 1040 may provide the user with a list of activities that the user is permitted to perform on the selected devices. The activities may include, for example, the ability to add a user to the devices, delete a user from the devices, or other types of activities. In the example illustrated in FIG. 10, the user has selected to add a user to the selected devices.

Once the user entered the appropriate information into graphical user interface 1000, such as selecting the devices on which an activity is to be performed and the activity to be performed (as well as any other necessary parameters), the user may register the activity by selecting ADD ACTIVITY button 1050. As a result, the activity may be added to activity list window 1060, which stores a list of activities that the user wishes to perform. Upon adding the activity to activity list window 1060, the user may register additional activities to be performed on devices in device list window 1020 in the manner described above.

Assume, for explanatory purposes, that the user has added the add user activity to activity list window 1060. The user may cause client 120 to transmit an activity request to server 130 by, for example, selecting the OK button. The activity request may include the information entered by the user into graphical user interfaces 800, 900, and/or 1000.

Upon receipt of the activity request (act 720) (FIG. 7), server 130 may assign a transaction number to the activity (act 725). Server 130 may, for example, sequentially assign transaction numbers. Therefore, server 130 may increment the most-recent transaction number by one to obtain the transaction number to assign to this activity. Server 130 may begin tracking the performance of the activity (act 725). For example, server 130 may store some or all of the information from the request, such as the identity of the user, the identity of the activity to be performed, and the identity of the devices on which the activity is to be performed. Server 130 may thereafter track all commands and parameters that are generated, transmitted, and/or received in connection with the performance of the activity on the devices, as described in copending, U.S. patent application Ser. No. 11/298,603, entitled "TRACKING USER ACCESS OF A NETWORK MANAGEMENT SYSTEM," filed concurrently herewith, the entire contents of which are expressly incorporated by reference herein. The tracking may be performed, for example, by log logic 440 (FIG. 4).

Server 130 may translate the received activity request into the physical commands needed to perform the activity on each of the devices (act 730). In one implementation consistent with the principles of the invention, server 130 may identify the physical commands corresponding to the activity for each device on which the activity is to be performed using database 500 (e.g., using activity_has_command table). Each set of physical commands may be in the native syntax of the device on which the commands will be performed. Therefore, server 130 translates a received activity request into sets of physical commands that are in the native syntax of the devices on which those commands will be performed, as described in detail in copending, U.S. patent application Ser. No. 11/298,605, entitled "NETWORK MANAGEMENT SYSTEM," filed concurrently herewith, the entire contents of which are expressly incorporated by reference herein.

As set forth above, server 130 may include a group of agents 430 (FIG. 4) that cause the activity to be performed on the devices. Agents 430 may forward all information that is transmitted to the devices and all information received from the devices to log logic 440. In this way, log logic 440 may create a log for each device that was selected by the user in graphical user interface 1000 (act 740). Agents 430 may store information relating to the user, the activity the user performed, and the devices on which the activity was performed in, for example, the csplog table of database 500.

Once the user has caused the activity request to be transmitted to server 130, server 130 may cause graphical user interface 900 (FIG. 9) to be provided to the user. The user may perform another activity on, for example, another device type or platform, or may view the status of the previous activity (or other activities) via transaction window 930.

CONCLUSION

Implementations consistent with the principles of the invention dynamically build graphical user interfaces for a user based on the user's profile stored in a relational database. The graphical user interfaces provide only that information that is relevant to the user, thereby facilitating the user's ability to traverse the graphical user interfaces. Using the graphical user interfaces, the user may perform a logical activity on one or more devices.

The foregoing description of exemplary implementations of the invention provides illustration and description, but is not intended to be exhaustive or to limit the invention to the precise form disclosed. Modifications and variations are possible in light of the above teachings or may be acquired from practice of the invention. For example, while the above description focused on server 130 performing certain acts and client 120 performing certain acts, it will be appreciated that in other implementations consistent with the principles of the invention, client 120 may perform some of the acts described as being performed by server 130 and server 130 may perform some of the acts described as being performed by client 120.

While series of acts have been described with respect to FIGS. 7A-9, the order of the acts may be varied in other implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
a non-transitory memory device to store a plurality of computer-executable instructions; and
one or more processors to execute the plurality of computer-executable instructions to:
store information identifying each device group of a plurality of device groups,
each device group including a plurality of devices,
store access information that:
identifies one or more users, and
indicates which device groups, of the plurality of device groups, each user, of the one or more users, is permitted to access, receive identification information from a user,
authenticate the user using the identification information, determine, based on the identification information, that the user is one of the one or more users,
identify, after the authenticating the user and using the access information, one or more device groups, of the plurality of device groups, that the user is permitted to access,
generate a first graphical user interface based on the one or more device groups that the user is permitted to access,
the first graphical user interface including a visual representation of at least one device group of the one or more device groups that the user is permitted to access, provide the first graphical user interface to the user,
receive a selection of the visual representation of the at least one device group based on providing the first graphical user interface,
identify one or more logical activities that are associated with the at least one device group,
generate a second graphical user interface based on the selection of the at least one device group,
the second graphical user interface including one or more selectable items associated with the one or more logical activities, and
provide the second graphical user interface to the user.

2. The system of claim 1, where each device of the plurality of devices included in the at least one device group comprise a same type of device.

3. The system of claim 1, where the one or more logical activities include one or more of:
an activity to add another user to the at least one device group,
an activity to remove the other user from the at least one device group, or
an activity to change a password used to authenticate the user.

4. The system of claim 1, where the second graphical user interface allows the user to perform a plurality of activities on one or more devices in the at least one device group,
the plurality of activities including the one or more logical activities.

5. A computer-implemented method comprising:
storing, by one or more server devices, information identifying a plurality of device groups,
each device group, of the plurality of device groups, including a plurality of devices;
storing, by the one or more server devices, access information that:
identifies one or more users, and
indicates which device groups, of the plurality of device groups,
each of the one or more users is permitted to access;
receiving, by the one or more server devices, user identification information from a user;
identifying, by the one or more server devices and based on the user identification information, that the user is one of the one or more users;
identifying, by the one or more server devices and using the access information, one or more device groups, of the plurality of device groups, that the user is permitted to access;
generating, by the one or more server devices, a first graphical user interface based on the user being permitted to access the one or more device groups,
the graphical user interface including one or more graphical representations representing the one or more device groups;
providing, by the one or more server devices, the first graphical user interface to the user;
receiving, by the one or more server devices, a selection of a particular graphical representation of the one or more graphical representations,
the particular graphical representation representing a particular device group of the one or more device groups;
identifying, by the one or more server devices and based on the selection, a logical activity associated with the particular device group;
generating, by the one or more server devices, a second graphical user interface that includes information identifying the logical activity;
providing, by the one or more server devices, the second graphical user interface to the user; and
receiving, by the one or more server devices and via the second graphical user interface, a command to perform the logical activity on the particular device group.

6. The method of claim 5, where identifying the one or more device groups occurs based on receiving the user identification information.

7. The method of claim 5, where the access information includes:
information identifying a relationship between the one or more users and one or more user profiles, and
information identifying a relationship between the one or more user profiles and device groups, of the plurality of device groups, and
where identifying the one or more device groups includes:
identifying the one or more user profiles using the user identification information and the information identifying the relationship between the one or more users and the one or more user profiles, and
identifying the one or more device groups based on the one or more user profiles and the information identifying the relationship between the one or more user profiles and the device groups.

8. A computer-implemented method comprising:
providing, by the computer, a relational database that stores:
a first set of tables that associates a user with groups of devices, of a plurality of groups of devices, that the user is permitted to access,
a second set of tables that associates the user with a first plurality of logical activities that the user is permitted to perform, and a third set of tables that associates the groups of devices with a second plurality of logical activities that is permitted to be performed on the groups of devices;

receiving, at the computer, information identifying the user;

storing, by the computer, information identifying the groups of devices using the information identifying the user and the first set of tables;

generating, by the computer, a first graphical user interface,
the first graphical user interface including a graphical representation of each group of devices, of the groups of devices, that the user is permitted to access, and
the first graphical user interface not including a graphical representation of other groups of devices, of the plurality of groups of devices, that the user is not permitted to access;

receiving, at the computer, a selection of one group of devices of the groups of devices;

retrieving, by the computer, information identifying one or more logical activities from the relational database based on the selection, the second set of tables, and the third set of tables; and generating, by the computer, a second graphical user interface based on the selection,
the second graphical user interface including the information identifying the one or more logical activities and permitting the user to perform the one or more logical activities on at least one device included in the one group of devices.

9. The method of claim 8, where each group of devices, in the groups of devices, includes devices of a same type.

10. The method of claim 8, where each group of devices, in the groups of devices, performs a specific function.

11. The method of claim 8, further comprising:
authenticating the user prior to retrieving the information identifying the one or more logical activities.

12. A non-transitory memory device storing instructions, the instructions comprising:
one or more instructions which, when executed by one or more processors, cause the one or more processors to:
receive an identification of a plurality of device groups, each device group, of the plurality of device groups, including a plurality of devices,
receive access information that:
identifies one or more users, and
indicates which device groups, of the plurality of device groups, that the one or more users are permitted to access,
receive identification information from a user,
authenticate the user using the identification information,
identify, based on the identification information, that the user is one of the one or more users,
identify, after the authenticating the user and using the access information, one or more device groups, of the plurality of device groups, that the user is permitted to access,
generate a first graphical user interface based on the one or more device groups,
the first graphical user interface including a visual representation of each of the one or more device groups,
the first graphical user interface not including a visual representation of other device groups, of the plurality of device groups, that the user is not permitted to access,
provide the first graphical user interface to the user,
receive a selection of the visual representation of one of the one or more device groups,
identify one or more activities that are associated with the one of the one or more device groups,
generate a second graphical user interface based on the selection,
the second graphical user interface including one or more selectable items associated with the one or more activities, and
provide the second graphical user interface to the user.

13. The non-transitory memory device of claim 12, where the one or more activities include one or more of:
an activity to permit another user to access the one of the one or more device groups,
an activity to remove the other user from the one of the one or more device groups, or
an activity to change a password used to authenticate the user.

14. The non-transitory memory device of claim 12, where the second graphical user interface allows the user to perform a plurality of activities on one or more devices included in the one of the one or more device groups.

* * * * *